United States Patent
Lee et al.

(10) Patent No.: US 10,979,206 B2
(45) Date of Patent: Apr. 13, 2021

(54) METHOD FOR PERFORMING TIME-DIVISION DUPLEX (TDD) COMMUNICATION BY TERMINAL IN WIRELESS COMMUNICATION SYSTEM AND TERMINAL USING SAME

(71) Applicant: LG ELECTRONICS INC., Seoul (KR)

(72) Inventors: Seungmin Lee, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 15/759,467

(22) PCT Filed: Sep. 12, 2016

(86) PCT No.: PCT/KR2016/010279
§ 371 (c)(1),
(2) Date: Mar. 12, 2018

(87) PCT Pub. No.: WO2017/043950
PCT Pub. Date: Mar. 16, 2017

(65) Prior Publication Data
US 2018/0270041 A1    Sep. 20, 2018

Related U.S. Application Data

(60) Provisional application No. 62/217,821, filed on Sep. 12, 2015.

(51) Int. Cl.
*H04L 5/14* (2006.01)
*H04L 12/24* (2006.01)
(Continued)

(52) U.S. Cl.
CPC .............. *H04L 5/14* (2013.01); *H04L 1/1812* (2013.01); *H04L 1/1854* (2013.01);
(Continued)

(58) Field of Classification Search
USPC .......................................................... 370/280
See application file for complete search history.

(56) References Cited

U.S. PATENT DOCUMENTS

2011/0310819 A1* 12/2011 Liao ...................... H04L 1/1614
370/329
2012/0213170 A1* 8/2012 Choi ...................... H04L 1/1861
370/329
(Continued)

FOREIGN PATENT DOCUMENTS

WO        2012134115        10/2012

OTHER PUBLICATIONS

3GPP TS 36.211 V8.5.0, Dec. 2008.

*Primary Examiner* — Alpus Hsu
*Assistant Examiner* — Hooman Houshmand
(74) *Attorney, Agent, or Firm* — Dentons US LLP

(57) ABSTRACT

The present invention provides a method for receiving multimedia broadcast single frequency network (MBSFN) configuration information in a wireless communication system, which is performed by a terminal for which a time division duplex (TDD) cell is configured, the method comprising: receiving the MBSFN configuration information including a bitmap; determining an MBSFN subframe on the basis of the MBSFN configuration information; and performing wireless communication on the basis of the determined MBSFN subframe, wherein the MBSFN configuration information is MBSFN configuration information for a TDD cell comprising only downlink subframes.

2 Claims, 14 Drawing Sheets

(51) Int. Cl.
*H04W 72/00* (2009.01)
*H04L 1/18* (2006.01)
*H04L 5/00* (2006.01)
*H04W 76/27* (2018.01)

(52) U.S. Cl.
CPC ............ *H04L 5/0055* (2013.01); *H04L 41/08* (2013.01); *H04L 41/0806* (2013.01); *H04W 72/005* (2013.01); *H04L 5/0007* (2013.01); *H04L 5/1469* (2013.01); *H04W 76/27* (2018.02)

(56) References Cited

U.S. PATENT DOCUMENTS

| | | | |
|---|---|---|---|
| 2012/0300681 A1 | 11/2012 | Ji et al. | |
| 2013/0215865 A1* | 8/2013 | Lee | H04W 52/04 370/329 |
| 2013/0301503 A1* | 11/2013 | Park | H04W 72/0406 370/311 |
| 2013/0308523 A1 | 11/2013 | Lee et al. | |
| 2014/0029484 A1* | 1/2014 | Choi | H04J 3/1694 370/280 |
| 2014/0293843 A1* | 10/2014 | Papasakellariou | H04W 72/042 370/280 |
| 2015/0009883 A1 | 1/2015 | Bai et al. | |
| 2015/0085713 A1* | 3/2015 | He | H04W 52/0274 370/280 |
| 2015/0257089 A1 | 9/2015 | Sun et al. | |
| 2016/0226631 A1* | 8/2016 | Seo | H04L 5/1469 |
| 2016/0242158 A1* | 8/2016 | Takeda | H04L 5/1469 |
| 2016/0249338 A1* | 8/2016 | Hwang | H04L 1/1671 |
| 2016/0254899 A1* | 9/2016 | Hwang | H04L 1/1861 370/280 |
| 2016/0309500 A1* | 10/2016 | Kim | H04L 5/0053 |

* cited by examiner

METHOD FOR PERFORMING TIME-DIVISION DUPLEX (TDD) COMMUNICATION BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2016/010279, filed on Sep. 12, 2016, which claims the benefit of U.S. Provisional Application No. 62/217,821 filed on Sep. 12, 2015, the contents of which are all hereby incorporated by reference herein in their entirety.

BACKGROUND OF THE INVENTION

Field of the Invention

The present invention relates to wireless communication, and more particularly, to a TDD communication method performed by a user device in a wireless communication system and the user device performing the method.

Related Art

In the International Telecommunication Union Radio Communication sector (ITU-R), standardization of International Mobile Telecommunication (IMT)—Advanced, which is a next generation mobile communication system after 3rd generation, is underway. IMT-Advanced aims to support IP (Internet Protocol) based multimedia service at a data transfer rate of 1 Gbps in a stationary and low-speed moving state, and at a data transfer rate of 100 Mbps in a high-speed moving state.

The 3rd Generation Partnership Project (3GPP) is preparing, as a system standard meeting the requirements of IMT-Advanced, the LTE-Advanced (LTE-A), an improved version of LTE (Long Term Evolution), based on OFDMA (Orthogonal Frequency Division Multiple Access)/SC-FDMA (Single Carrier-Frequency Division Multiple Access) transmission scheme. LTE-A is one of the strong candidates for IMT-Advanced.

The frame structure includes a TDD frame and an FDD frame. In this connection, the TDD frame may include the uplink subframe, the downlink subframe, and/or the special subframe.

Under the TDD system in which the user device performs wireless communication using a TDD frame, in order to efficiently support the situation where the downlink load condition is high, it is necessary to maximize the downlink subframe.

Therefore, according to the present invention, there are provided a method for signaling the MBSFN subframe to the user device, and HARQ-ACK signaling method when a TDD cell including only a downlink subframe and a TDD cell including only a downlink subframe are configured for the user device. Further, there is provided a device configured to perform the method.

SUMMARY OF THE INVENTION

The present invention provides a TDD communication method performed by a user device in a wireless communication system, and a user device performing the method.

In an aspect, a method for receiving Multimedia Broadcast Single Frequency Network (MBSFN) configuration information by a user equipment for which a Time Division Duplex (TDD) cell is configured, in a wireless communication system is provided. The method may comprise receiving the MBSFN configuration information including a bitmap, determining an MBSFN subframe based on the received MBSFN configuration information, and performing wireless communication based on the determined MBSFN subframe. The MBSFN configuration information may be MBSFN configuration information for a TDD cell composed only of a downlink subframe.

When a TDD cell composed of only the downlink subframe is configured, the bitmap may be the same as a bitmap of MBSFN configuration information for a FDD (Frequency Division Duplex) cell.

When a TDD cell composed of only the downlink subframe is configured, the bitmap may include bits respectively and sequentially indicating whether a second subframe, a third subframe, a fourth subframe, a seventh subframe, an eighth subframe, and a ninth subframe on a frame composed of ten subframes are configured as an MBSFN subframe.

The bit indicating whether the second subframe may be configured as an MBSFN subframe is a last bit of the bitmap of the MBSFN configuration information for the TDD cell.

When the MBSFN configuration information includes a bitmap for one frame, the bit indicating whether the second subframe may be configured as an MBSFN subframe is a last bit of the bitmap for the one frame.

When the MBSFN configuration information may include a bitmap for four frames, the bit indicating whether the second subframe is configured as an MBSFN subframe includes last four bits of the bitmap for the four frames.

In another aspect, a method for Automatic Repeat and Request (HARQ)-ACK transmission in a wireless communication system is provided. The method may be performed by a user equipment for which a TDD (Time Division Duplex) primary cell and a TDD secondary cell are configured and may comprise receiving HARQ-ACK transmission timing configuration information for the TDD secondary cell, determining HARQ-ACK transmission timing based on the HARQ-ACK transmission timing configuration information, and performing HARQ-ACK transmission of the TDD secondary cell via the TDD primary cell based on the determined HARQ-ACK transmission timing. The HARQ-ACK transmission timing configuration information may be HARQ-ACK transmission timing configuration information for a TDD secondary cell including only a downlink subframe.

The HARQ-ACK transmission timing configuration information may be the same as HARQ-ACK transmission timing configuration information for an FDD (Frequency Division Duplex) secondary cell.

Receiving the HARQ-ACK transmission timing configuration information for the TDD secondary cell may include receiving the HARQ-ACK transmission timing configuration information for the TDD secondary cell via RRC signaling.

In the other aspect, a user equipment is provided. The UE may comprise a radio frequency (RF) unit configured for transmitting and receiving a radio signal, and a processor operatively coupled to the RF unit. The processor may be configured for controlling the RF unit to receive MBSFN configuration information including a bitmap, determining an MBSFN subframe based on the received MBSFN configuration information, and performing wireless communication based on the determined MBSFN subframe. The MBSFN configuration information may be MBSFN configuration information for a TDD cell composed only of a downlink subframe.

According to one embodiment of the present invention, a TDD communication method carried out by the user device in a wireless communication system and the user device using the same are provided.

According to one embodiment of the present invention, a communication method in a TDD cell consisting of a downlink subframe in a wireless communication system, and the user device using the same are provided. More specifically, according to the present invention, when applying TDD ALL DL CONFIGURATION, an MBSFN subframe and HARQ TIMELINE configuration method is provided. In this connection, as for the MBSFN subframe, when the TDD cell is allocated to the user device, the second subframe may not be configured as an MBSFN subframe in the conventional approach. However, according to the present invention, the second subframe may be configured as an MBSFN subframe, thereby increasing the number of subframes available as an MBSFN subframe in the TDD system. In addition, according to the present invention, legacy MBSFN subframe configuration information may be used, so that changes in the legacy specification are minimized. For the HARQ TIMELINE configuration method, when the secondary cell configured for the user device is the TDD cell, and, in this connection, the TDD cell consists of downlink subframe only, the HARQ-ACK transmission method in legacy TDD-FDD carrier aggregation may be used, so that changes in the legacy specification are minimized.

DESCRIPTION OF EXEMPLARY EMBODIMENTS

Figure 1:
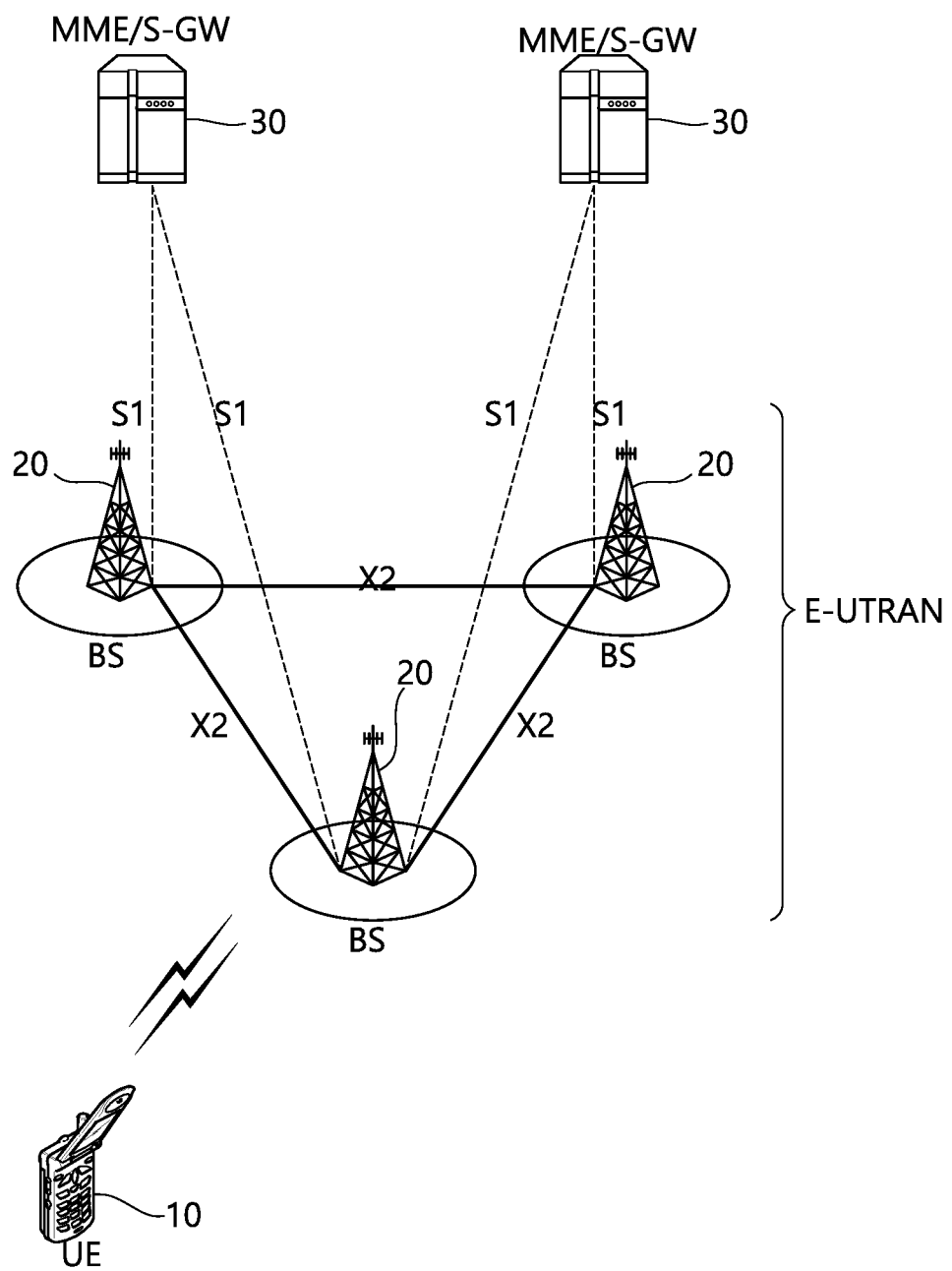
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
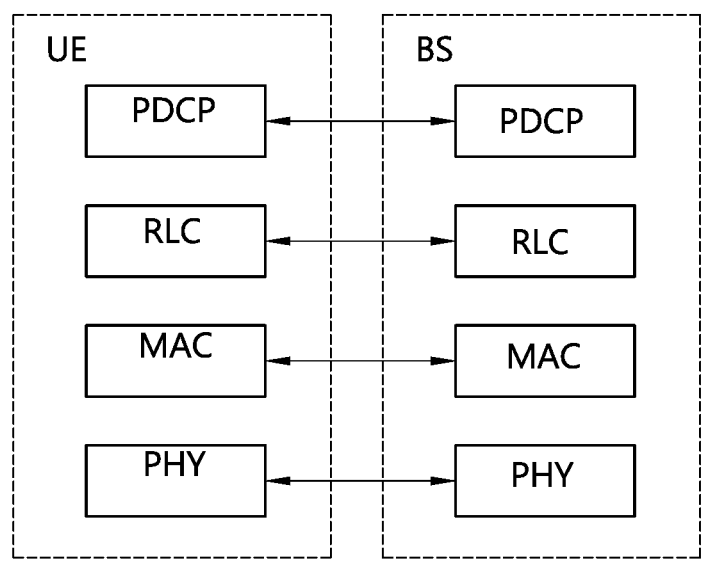
FIG. 2 is a diagram showing a wireless protocol architecture for a user plane.
Figure 3:
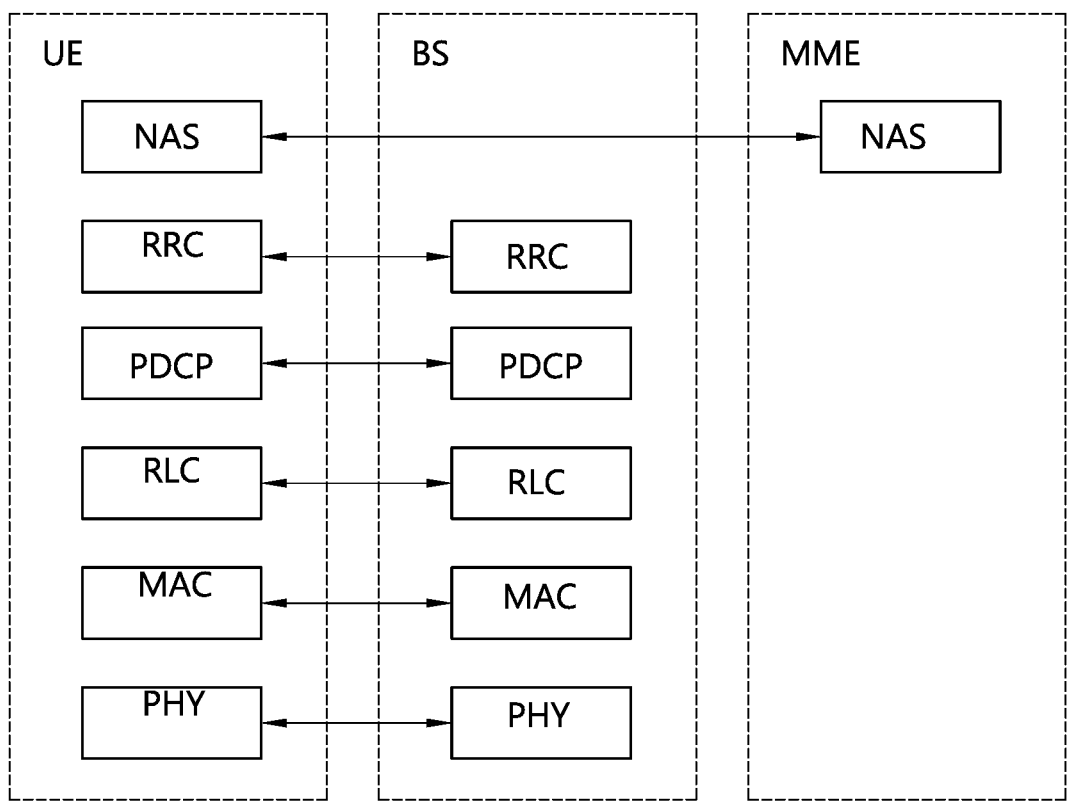
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
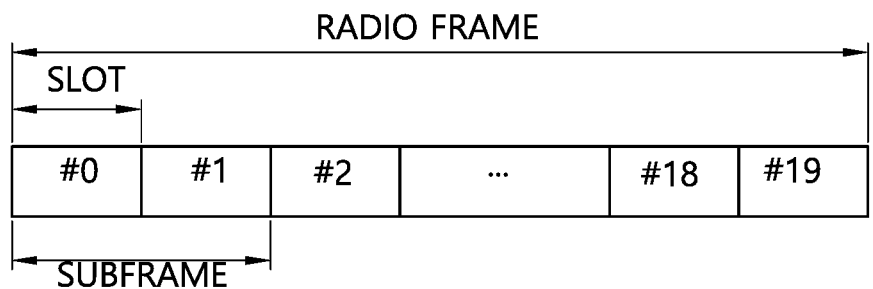
FIG. 4 illustrates a radio frame structure of 3GPP LTE.

FIG. 4 illustrates a radio frame structure of 3GPP LTE.

Referring to FIG. 4, a radio frame is constituted by 10 subframes and one subframe is constituted by two slots. As one example, a length of one subframe may be 1 ms and the length of one slot may be 0.5 ms. A time required for transmitting one subframe is referred to as a transmission time interval (TTI). The TTI may be a minimum unit of scheduling. The structure of the radio frame is merely an example and the number of subframes included in the radio frame and the number of slots included in the subframe may be variously changed.

Figure 5:
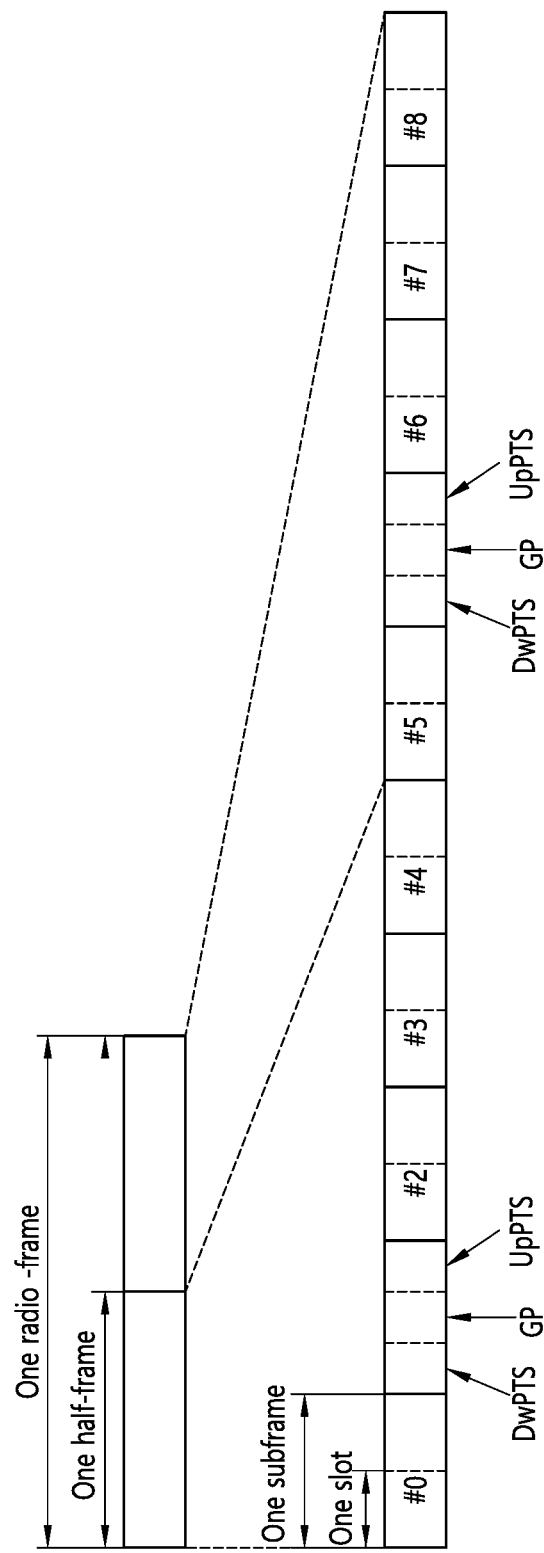
FIG. 5 shows a structure of a TDD (Time Division Duplex) radio frame.

FIG. 5 shows a structure of a TDD (Time Division Duplex) radio frame.

Referring to FIG. 5, a subframe having index #1 and index #6 is called a special subframe, and includes DwPTS (DwPTS), Guard Period (GP) and UpPTS (Uplink Pilot Time Slot). DwPTS is used for initial cell search, synchronization, or channel estimation on the user device. UpPTS is used for channel estimation at the base station and is used for uplink transmission synchronization at the user device. The GP is a section in which the interference caused in the uplink due to the multipath delay of the downlink signal between the uplink and the downlink is removed.

In TDD, DL (downlink) subframe and UL (Uplink) subframe coexist in one radio frame. Table 1 shows an example of a UL-DL configuration (UL-DL configuration) of a radio frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' denotes a DL subframe, 'U' denotes a UL subframe, and 'S' denotes a special subframe. When the user device receives the UL-DL configuration from the base station, the user device may know whether each subframe in the radio frame is a DL subframe or a UL subframe. Hereinafter, the UL-DL configuration N (N is any one of 0 to 6) may refer to the Table 1 above.

Figure 6:
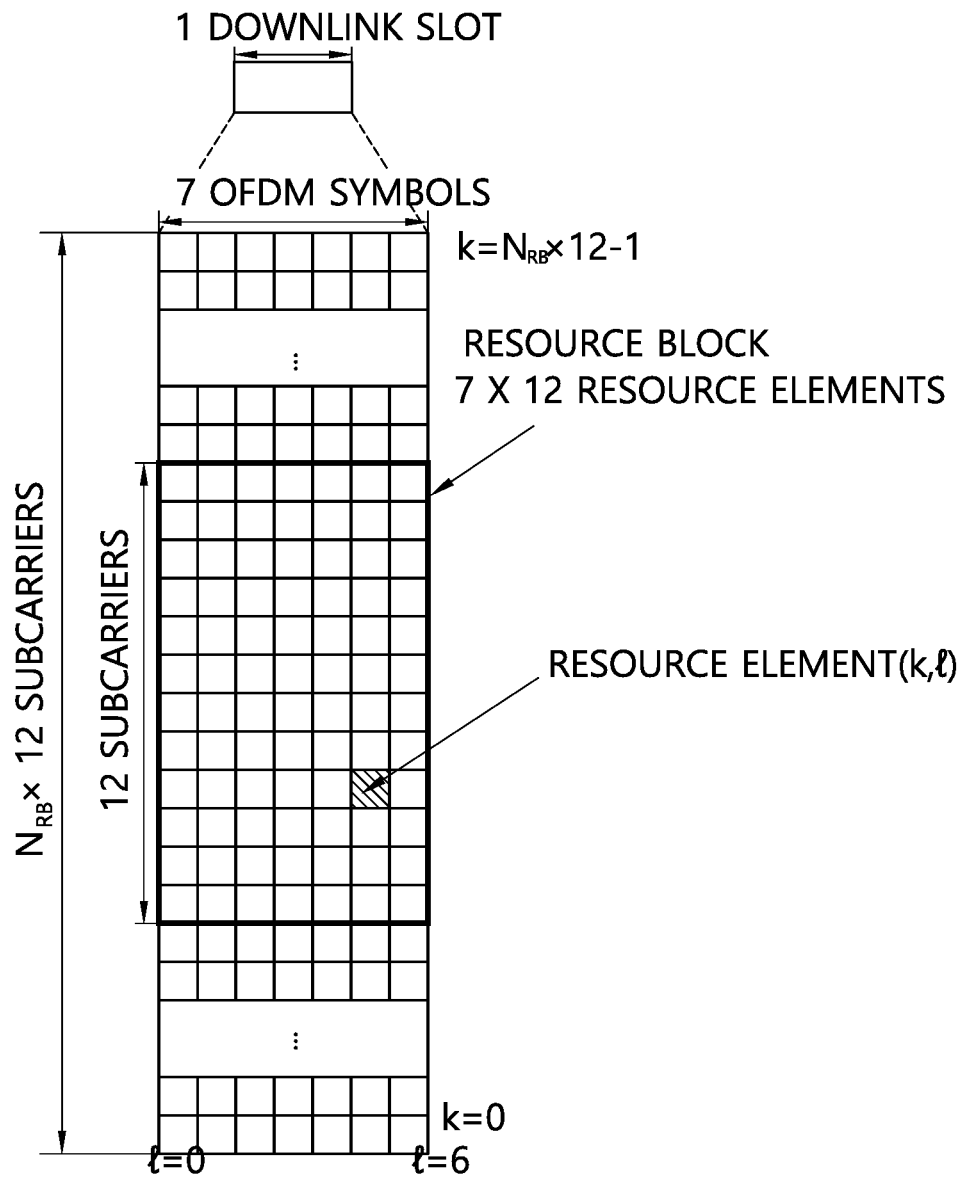
FIG. 6 is an exemplary diagram illustrating a resource grid for one downlink slot.

FIG. 6 is an exemplary diagram illustrating a resource grid for one downlink slot.

One slot in the radio frame includes a plurality of orthogonal frequency division multiplexing (OFDM) symbols in a time domain. The OFDM symbol is used to represent one symbol period because 3GPP LTE uses OFDMA in a downlink and may be referred to as another name depending on a multiple access scheme. For example, when SC-FDMA is used, the OFDM symbol may be referred to as an SC-FDMA symbol. It is exemplarily described that one slot includes 7 OFDM symbols, but the number of OFDM symbols included in one slot may be changed according to the length of a cyclic prefix (CP). According to 3GPP TS 36.211 V8.5.0 (2008-12), one subframe in a normal CP includes 7 OFDM symbols and one subframe in an extended CP includes 6 OFDM symbols.

In addition, one slot includes a plurality of resource blocks (RBs) in a frequency domain. A resource block includes a plurality of consecutive subcarriers in one slot as a resource allocation unit. In the resource block, the subcarrier may have an interval of 15 KHz, for example.

Each element on the resource grid is referred to as a resource element (RE) and one resource block includes 12×7 resource elements. The number of resource blocks, $N_{DL}$ included in a downlink slot depends on a downlink transmission bandwidth set in a cell. The resource grid described in FIG. 5 may be applied even in an uplink.

Figure 7:
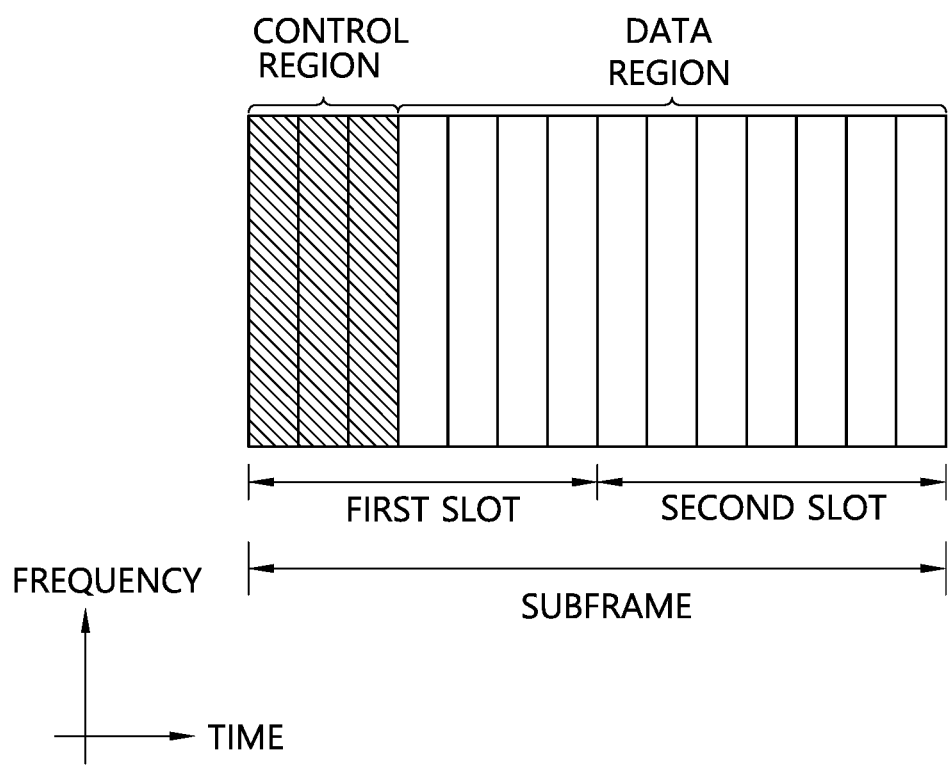
FIG. 7 illustrates a structure of a downlink subframe.

FIG. 7 illustrates a structure of a downlink subframe.

Referring to FIG. 7, the subframe includes two consecutive slots. A former maximum of 3 OFDM symbols of a first slot in the subframe are control regions to which control channels are allocated and the remaining OFDM symbols are data regions to which a data channel is allocated. The control region may be constituted by a maximum of 4 OFDM symbols according to a system band.

The control channels allocated to the control region include a physical control format indication channel (PCFICH), a physical hybrid-ARQ indicator channel (PHICH), and a physical downlink control channel (PDCCH). The PCFICH is a control channel through which information indicating the size of the control region, that is, the number of OFDM symbols constituting the control region is transmitted. The PHICH is a control channel for carrying acknowledgment/not-acknowledgment (ACK/NACK) for uplink data transmission of the UE. The PDCCH may carry resource allocation (also referred to as a downlink (DL) grant) and a transmission format of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. Control information transmitted through the PDCCH is referred to as downlink control information (DCI).

DCI formats include format 1 for physical uplink shared channel (PUSCH) scheduling, format 1 for scheduling one PDSCH codeword, format 1A for compact scheduling of one PDSCH codeword, format 1B for compact scheduling for rank-1 transmission of a single codeword in a spatial multiplexing mode, format 1C for very compact scheduling of the downlink shared channel (DL-SCH), format 1D for PDSCH scheduling in a multi-user spatial multiplexing mode, format 2 for PDSCH scheduling in a closed-loop spatial multiplexing mode, format 2A for PDSCH scheduling in an open-loop spatial multiplexing mode, format 3 for transmitting a 2-bit power control transmission power control TPC) command for the PUCCH and the PUSCH, and format 3A transmitting a 1-bit power control TPC command of the PUCCH and the PUSCH.

Figure 8:
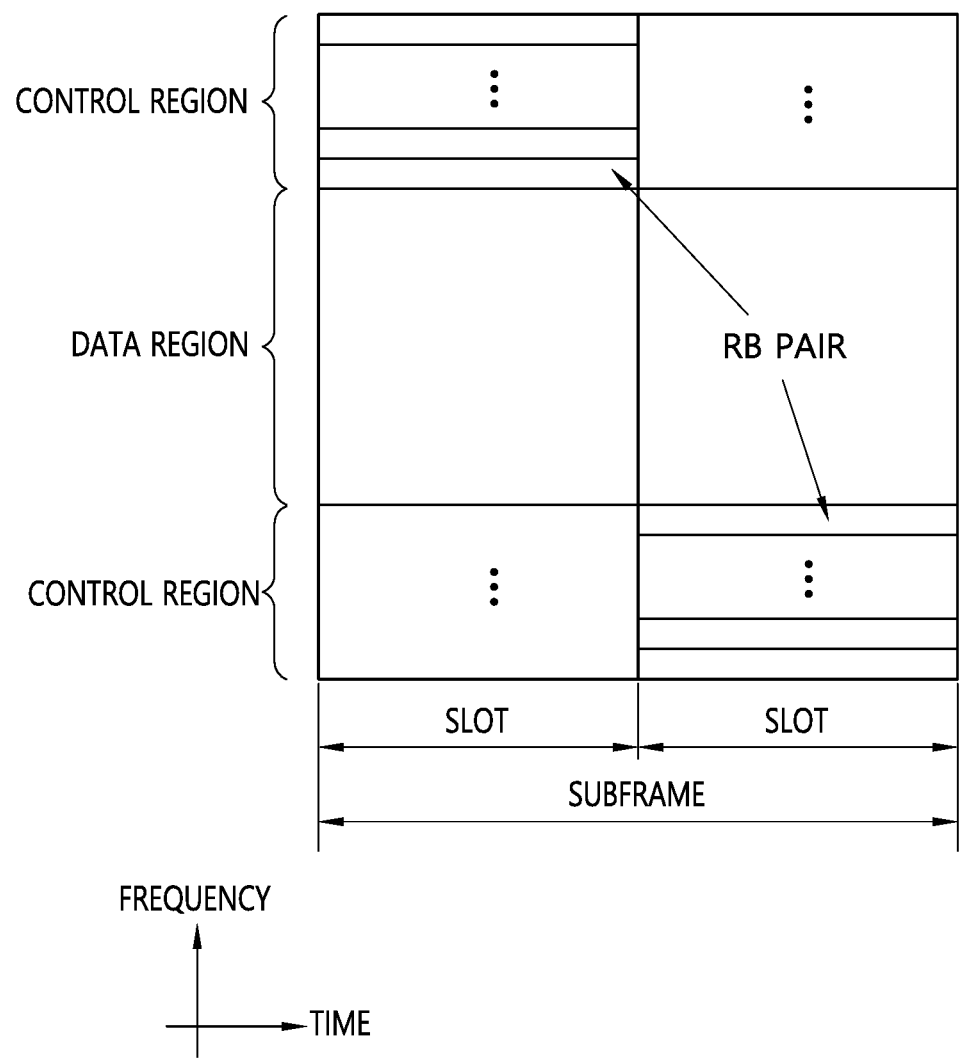
FIG. 8 illustrates the structure of an uplink subframe.

FIG. 8 illustrates the structure of an uplink subframe.

Referring to FIG. 8, the uplink subframe may be divided into a control region to which the physical uplink control channel (PUCCH) for carrying uplink control information is allocated and a data region to which the physical uplink shared channel (PUSCH) for carrying user data is allocated in a frequency domain.

The PUCCH for one UE is allocated to a pair of resource blocks (RBs) and the RBs which belong to the pair of RBs occupy different subcarriers in two slots, respectively. In this case, the pair of RBs allocated to the PUCCH frequency-hop in a slot boundary.

Hereinafter, the carrier aggregation system will be described.

The LTE-A system uses Carrier Aggregation (CA). In this connection, carrier aggregation refers to aggregation of multiple component carriers (CCs) to receive and transmit the aggregation. Via the carrier aggregation, the LTE system improves the transmission bandwidth of the user device and increases the frequency utilization efficiency.

Component carriers may be divided into Primary Component Carrier (PCC) and Secondary Component Carrier (SCC). The primary component carrier (PCC) refers to the component carrier which may be a reference or a center for the management of the component carriers when using the multiple component carriers. The primary component carrier (PCC) is defined for each user device. The primary component carrier (PCC) may be referred to as a primary cell (Pcell).

Further, component carriers other than the primary component carrier (PCC) may be defined as secondary component carriers (SCCs). The secondary component carrier may be referred to as a secondary cell (Secondary Cell; SCell). The user device may also perform the uplink transmission via the secondary cell.

Figure 9:
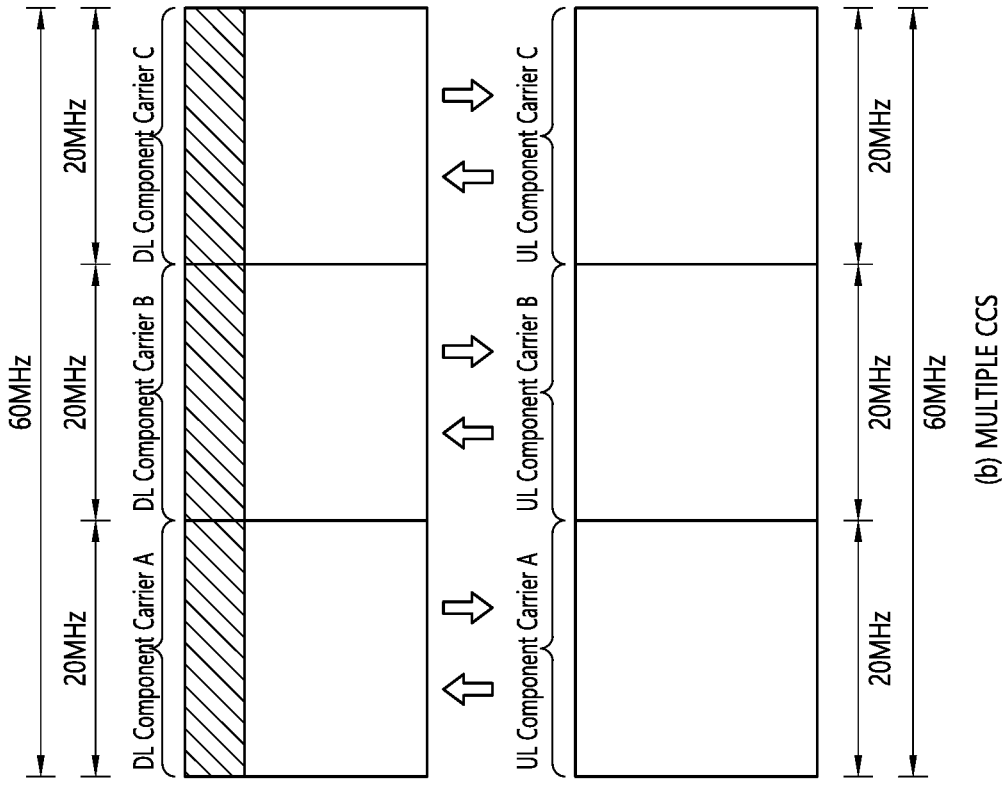
FIG. 9 illustrates an example of comparison between a single carrier system and a carrier aggregation system.
Figure 9:
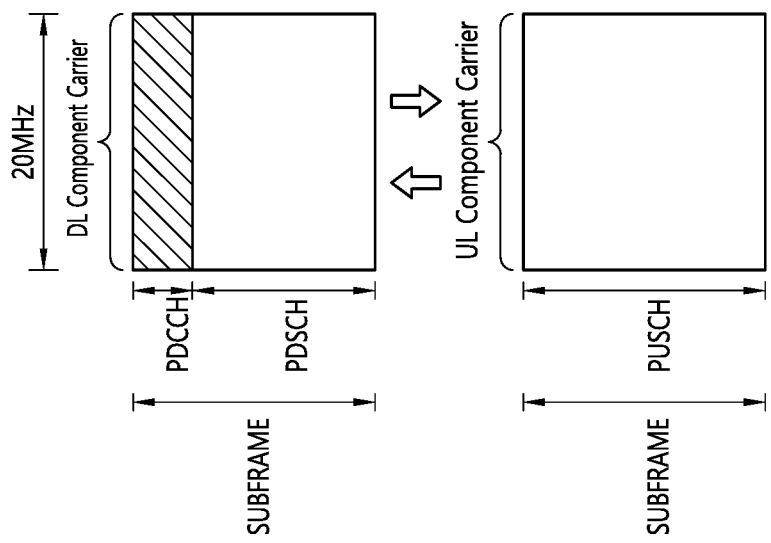

FIG. 9 illustrates an example of comparison between a single carrier system and a carrier aggregation system.

Referring to FIG. 9, there may be various carrier bandwidths, and one carrier is assigned to the user device. On the contrary, in the carrier aggregation (CA) system, a plurality of component carriers (DL CC A to C, UL CC A to C) may be assigned to the user device. Component carrier (CC) means the carrier used in then carrier aggregation system and may be briefly referred as carrier. For example, three 20 MHz component carriers may be assigned so as to allocate a 60 MHz bandwidth to the user device.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Alternatively, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the user device should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. In this connection, the "activation" means that data transmission or reception is being conducted or is in ready state. The user device may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The user device may receive system information (SI) necessary for receiving packets from the deactivated cell. In contrast, the user device does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the user device conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the user device cannot offer carrier aggregation. In case carrier aggregation is configured, the term "serving cell" denotes a cell configured to the user device and a plurality of serving cells may be included. A plurality of serving cells may consist of a primary cell and one or more of all the secondary cells.

The PCC (primary component carrier) means a component carrier (CC) corresponding to the primary cell. The PCC is, among several CCs, the one where the user device initially achieves connection or RRC connection with the base station. The PCC is a special CC that is in charge of connection or RRC connection for signaling regarding multiple CCs and manages user device context information (UE context) that is connection information related with the user device. Further, the PCC achieves connection with the user device, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the user device and is an extended carrier for the user device to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

When configuring a serving cell, a downlink component carrier may form one serving cell or a downlink component carrier and an uplink component carrier form a connection to thereby configure one serving cell. In a conventional approach, a serving cell is not configured with one uplink component carrier alone. However, in the present disclosure, a serving cell may be configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

The base station may configure a PDCCH monitoring DL CC (monitoring CC) set. The PDCCH monitoring DL CC set consists of some of all the aggregated DL CCs. If cross-carrier scheduling is configured, the user device conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured user device-specifically, user device group-specifically, or cell-specifically.

Non-cross carrier scheduling (NCCS) means that scheduling information and data corresponding thereto is received/transmitted using the same carrier. This is also referred to as self-scheduling. Non-cross carrier scheduling may be a scheduling method that is applied to the user device for which only a single cell is configured in a conventional approach.

Hereinafter, the MBSFN subframe will be described.

Figure 10:
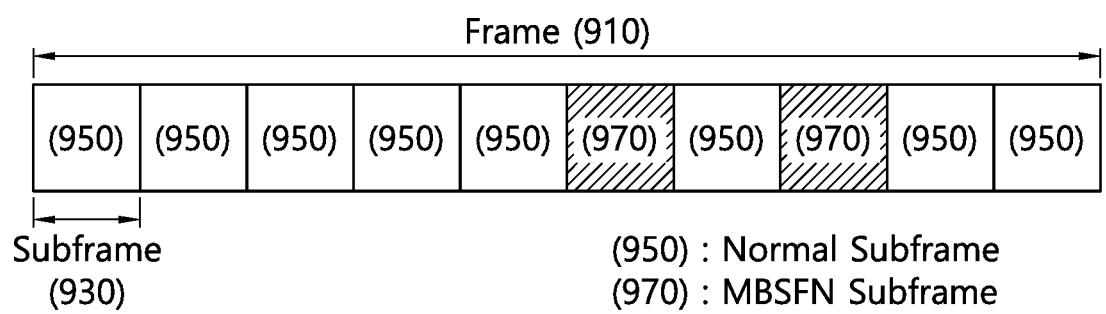
FIG. 10 is a conceptual diagram illustrating the structure of a MBS subframe (MBSFN) subframe.
Figure 10:
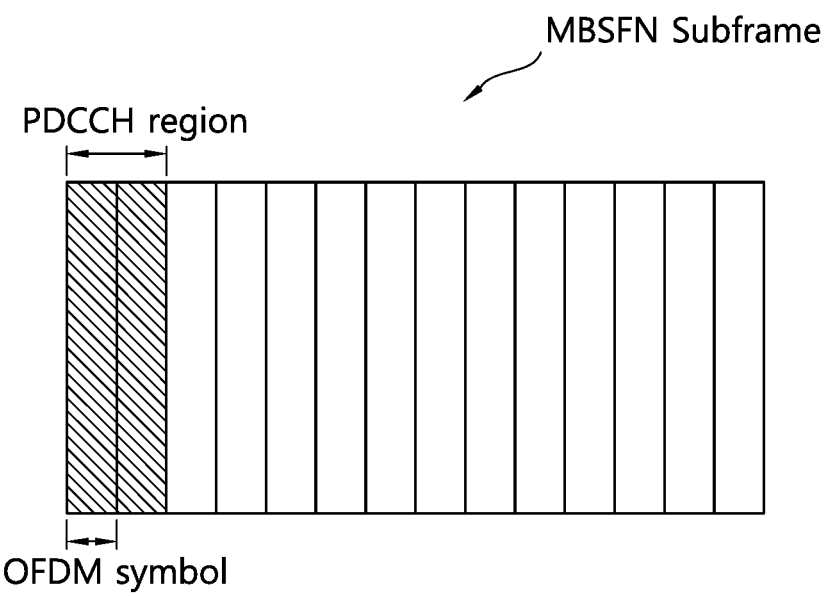

FIG. 10 is a conceptual diagram illustrating the structure of a MBS subframe (MBSFN) subframe.

Referring to FIG. 10, 10 subframes included in one frame 910 may include a general subframe 950 used for transmission and reception of general data and an MBSFN subframe 970 used for broadcast or multicast. The general subframe 950 and the MBSFN subframe 970 may have a difference in terms of the number of OFDM symbols, the length of CP, and the structure and number of CRSs. In the legacy LTE-Rel 8 and LTE-Rel 9 systems, the MBSFN subframe 970 is used only for the purpose of transmitting broadcast or multicast data. However, from the LTE-Rel 10 system, the MBSFN subframe 970 may be used for broadcast or multicast purposes as well as for unicast purposes, which are data transmissions for specific user devices.

Referring to a lower portion of FIG. 10, the MBSFN subframe may specific, as a subframe for transmitting a PMCH (physical multicast channel), a subframe in which CRS may not be transmitted in the remaining regions other than the PDCCH region 990 including first two OFDM symbols. The PDCCH region 990 may be one OFDM symbol.

The user device for which the MBSFN subframe reception is not configured may not receive downlink data in other regions than the PDCCH region 990. MBSFN configuration information is information that configures the MBSFN subframe. The MBSFN configuration information may also be transmitted via an upper layer signal. For example, the base station may transmit MBSFN configuration information via SIB-2 transmitted over the PDSCH. The MBSFN configuration information may include information such as a bitmap indicating an MBSFN subframe, a radio frame allocation period, a radio frame allocation offset, and a subframe allocation, etc.

The MBSFN configuration information may mean MBSFN subframe configuration information. MBSFN subframe configuration information may be as shown in the table below.

TABLE 2

```
-- ASN1START
MBSFN-SubframConfig ::=         SEQUENCE {
    radioframeAllocationPeriod      ENUMERATED {n1, n2, n4, n8, n16, n32},
    radioframeAllocationOffset      INTEGER (0..7),
    subframeAllocation          CHOICE {
        oneFrame            BIT STRING (SIZE(6)),
        fourFrames          BIT STRING (SIZE(24))
    }
}
-- ASN1STOP
```

In this connection, each parameter of the MBSFN subframe configuration information may be as follows.

(1) First, 'fourFrames' may mean a bitmap indicating MBSFN subframe allocation in four consecutive radio frames. In this connection, '1' may mean that the corresponding subframe is allocated for the MBSFN (That is, '1' in the bitmap may indicate that a subframe corresponding to the bitmap is an MBSFN subframe). In this connection, the bitmap may be interpreted as follows:

As for Frequency Division Duplex (FDD): Starting from the first/leftmost bits of the bitmap and from the first radio frame, the bitmap may be applied to subframes #1, #2, #3, #6, #7 and #8 in the order of the four radio frames. That is, the subframes #1, #2, #3, #6, #7 and/or #8 may be MBSFN subframes. In this connection, subframes #0, #4, #5, and #9 do not correspond to the MBSFN subframe because synchronization information may be received in the subframes #0, #4, #5 and #9.

As for TDD: Starting from the first/leftmost bits of the bitmap and from the first radio frame, the bitmap may be applied to subframes #3, #4, #7, #8 and #9 in the order of the four radio frames. That is, the subframes #3, #4, #7, #8 and/or #9 may be MBSFN subframes. In this connection, TDD, subframe #2 is always used for uplink, and thus does not correspond to the MBSFN subframe.

In this connection, in case of FDD, there are six MBSFN target (or candidate) subframes, whereas in case of TDD, there are only five MBSFN target (or candidate) subframes. Due to this, in the bitmap, the last four bits are not used (In summary, in TDD, there are five MBSFN target (or candidate) subframes, while in FDD, there are six MBSFN target (or candidate) subframes. Thus, there is only one MBSFN target (or candidate) subframe difference between the TDD and the FDD. However, because 'FourFrames' is a bitmap indicating MBSFN subframe allocation in four consecutive radio frames, in the case of TDD in 'fourFrames', four bits are not used).

In this connection, the base station may allocate the uplink subframe only when eimta-MainConfig is configured.

(2) 'oneFrame' may mean a bitmap indicating MBSFN subframe allocation in one radio frame. In this connection, '1' may mean that the corresponding subframe is allocated for the MBSFN (That is, '1' in the bitmap may indicate that the subframe corresponding to the bitmap is an MBSFN subframe). In this connection, the bitmap may be interpreted as follows:

As for FDD: The first/leftmost bit of the bitmap may define that the MBSFN is allocated for subframe #1. The second bit may define that MBSFN is allocated for subframe #2. The third bit may define that MBSFN is allocated for subframe #3. The fourth bit may define that MBSFN is allocated for subframe #6. The fifth bit may define that the MBSFN is allocated for subframe #7. In addition, the sixth bit may define that MBSFN is allocated for subframe #8.

With respect to TDD: The first/leftmost bit of the bitmap may define that the MBSFN is allocated for subframe #3. The second bit may define that the MBSFN is allocated for subframe #4. The third bit may define that MBSFN is allocated for subframe #7. The fourth bit may define that MBSFN is allocated for subframe #8. The fifth bit may define that the MBSFN is allocated for subframe #9. In this connection, the base station may allocate the uplink subframe only when eimta-Main-Config is configured.

In this connection, in case of FDD, there are six MBSFN target (or candidate) subframes, whereas in case of TDD, there are only five MBSFN target (or candidate) subframes. As a result, the last bit of the bitmap is not used.

Hereinafter, an example of HARQ (Hybrid Automatic Repeat and Request)-ACK timing of the FDD SCELL under the CA situation of the TDD PCELL and the FDD SCELL will be described.

More specifically, the FDD-TDD HARQ-ACK feedback procedure for the case where the frame structure type of the primary cell is 2 (that is, when the primary cell is a TDD-based cell) may be configured as follows.

The configuration that the user device may use PUCCH format 1b or PUCCH format 3 together with channel selection for HARQ-ACK transmission may be performed by an upper layer.

In this connection, when, regarding the serving cell (that is, regarding the secondary cell), the serving cell uses the frame structure type 1 (that is, the serving cell (secondary cell) uses the FDD frame), and the user device is not configured to monitor the PDCCH/EPDCCH in another serving cell (secondary cell) for the serving cell (secondary cell) scheduling, the user device may be configured to transmit the ACK-NACK signal of the secondary cell via the primary cell, based on Table 3 below.

this connection, the $5^{th}$ and $6^{th}$ subframes may mean subframes of the secondary cell). Further, the user device transmits, via a PUCCH of subframe #8 of the primary cell, ACK/NACK information about downlink data received in 4th and 5th subframes before the subframe #8 of the secondary cell (in this connection, the $4^{th}$ and $5^{th}$ subframes may mean subframes of the secondary cell). Further, the user device transmits, via a PUCCH of subframe #9 of the primary cell, ACK/NACK information about downlink data received in 4th subframe before the subframe #9 of the secondary cell (in this connection, the $4^{th}$ subframe may mean subframes of the secondary cell).

As described in the above example, when the indexes of UL-DL configuration are 1, 2, 3, 4, 5 and/or 6, respectively, a method of transmitting ACK/NACK information for downlink data received in a subframe of a secondary cell via a primary cell may be defined as shown in Table 3.

The present invention will be described below.

As described above, the frame structure includes a TDD frame and an FDD frame. In this connection, the TDD frame may include the uplink subframe, the downlink subframe, and/or the special subframe.

Under the TDD system in which the user device performs wireless communication using a TDD frame, in order to efficiently support the situation where the downlink load condition is high, a TDD cell consisting only of downlink subframes may be configured for the user device. That is, a TDD frame consisting of only downlink subframes may be configured for the user device.

In this connection, a TDD frame composed only of downlink subframes may have a form similar to an FDD

TABLE 3

| DL-reference UL/DL Configuration | \multicolumn{10}{c}{Subframe n} | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

For example, in Table 3, if the index of the UL-DL configuration is 0, the user device transmits, via (PUCCH of) subframe #2 of the primary cell, ACK/NACK information about downlink data received in 5th and 6th subframes before the subframe #2 of the secondary cell (in this connection, the $5^{th}$ and $6^{th}$ subframes may mean subframes of the secondary cell). Further, the user device transmits, via a PUCCH of subframe #3 of the primary cell, ACK/NACK information about downlink data received in 4th and 5th subframes before the subframe #3 of the secondary cell (in this connection, the $4^{th}$ and $5^{th}$ subframes may mean subframes of the secondary cell). Further, the user device transmits, via a PUCCH of subframe #4 of the primary cell, ACK/NACK information about downlink data received in 4th subframe before the subframe #4 of the secondary cell (in this connection, the $4^{th}$ subframe may mean subframes of the secondary cell). Further, the user device transmits, via (PUCCH of) subframe #7 of the primary cell, ACK/NACK information about downlink data received in 5th and 6th subframes before the subframe #7 of the secondary cell (in frame (in particular, a downlink FDD frame). Therefore, when the TDD frame is composed of only downlink subframes, whether legacy TDD-based MBSFN configuration information is used or another approach is used may be an issue in determining the MBSFN subframe by the user device. In addition, even when the TDD frame of the secondary cell configured for the user device is composed only of downlink subframes, it may be an issue whether to perform legacy TDD-based HARQ-ACK signaling or HARQ-ACK signaling in a manner similar to FDD.

Hereinafter, in order to solve the above-mentioned problems, there will be described 1. a method to signal MBSFN subframe to the user device when the TDD frame consists of only downlink subframes; and 2. a HARQ-ACK signaling method when the TDD frame is composed of downlink subframes only and, in this connection, the TDD frame is used as a secondary cell.

Hereinafter, a proposed scheme based on the 3GPP LTE system will be described for convenience of explanation. However, the scope of the system to which the proposed scheme is applied may be expanded to another system in addition to the 3GPP LTE system.

1. A method to signal MBSFN subframe to the user device when the TDD frame consists of only downlink subframes Conventionally, although the number of bits required for the configuration of the MBSFN subframe under the TDD system is smaller than the number of bits required for the configuration of the MBSFN subframe under the FDD system (for example, in the case of 'fourFrames', the number of bits required to configure the MBSFN subframe in TDD is smaller, by four, than the number of bits required to configure the MBSFN subframe in FDD; In the case of 'oneFrame', the number of bits required to configure the MBSFN subframe in TDD is smaller, by one, than the number of bits required to configure the MBSFN subframe in the FDD), in case of TDD, redundant bits (for example, four redundant bits in 'fourFrames' and one redundant bit in 'oneFrame') of the bits of MBSFN configuration information occur since the MBSFN configuration information is composed of the same bits (for example, the information is composed of 24 bits for 'fourFrames' and is composed of 6 bits for 'oneFrame'), regardless of whether the system (or cell) configured for the user device is a TDD system (or cell) or an FDD system (or cell).

In this connection, in case of TDD system, redundant bit occurs as compared with FDD system for a following reason: In the case of legacy TDD, the subframe #2 may not become an MBSFN subframe since, in the legacy TDD frame, the subframe #2 (that is, second subframe) is always configured as the uplink subframe.

However, as described above, when the TDD frame including only downlink subframes is configured for the user device, the subframe #2 corresponds to the downlink subframe. Accordingly, new MBSFN subframe configuration information other than MBSFN configuration information for legacy TDD needs to be defined.

Thus, in order to efficiently support situations where the downlink load is high (under the TDD system (/band)), the present invention proposes a method for efficiently designating (/signaling) MBSFN SUBFRAME(S) when (new) TDD CONFIGURATION (that is, named "ALLDL_TDD-CONFIG") consisting only of downlink subframes is configured/applied.

Figure 11:
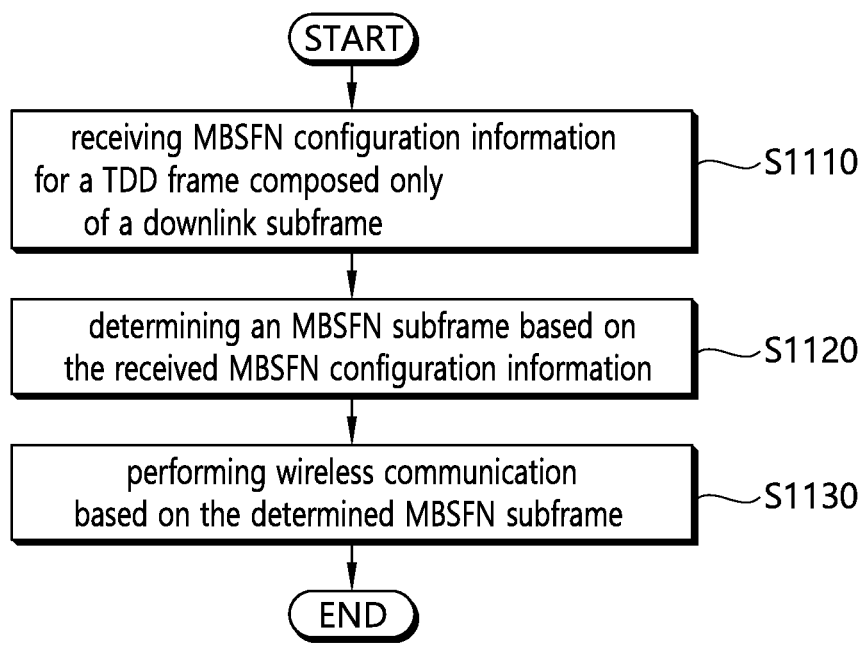
FIG. 11 is a flowchart of a method for configuring an MBSFN subframe according to one embodiment of the present invention.

FIG. 11 is a flowchart of a method for configuring an MBSFN subframe according to one embodiment of the present invention.

Referring to FIG. 11, the user device may receive MBSFN configuration information (S1110). In this connection, the MBSFN configuration information received by the user device may include a bitmap. The MBSFN configuration information may indicate MBSFN configuration information on a TDD frame composed of only downlink subframes.

In this connection, the bitmap of MBSFN configuration information may be defined as follows.

[Proposed method #1] In one example, in case of TDD CELL (named "ALLDL_CELL") for which ALLDL_TDD-CONFIG (for example, "DDDDDDDDDD") is configured, the application of MBSFN SUBFRAME CONFIGURATION BITMAP (named "MBSFN_BITMAP") (for example, 6 bits, 24 bits (see Table 2)) may be assumed to be the same as in the case of FDD CELL.

In this connection, in one concrete example, (as opposed to the legacy TDD cell), ALLDL_CELL-related MBSFN_BITMAP may indicate whether "SUBFRAME #1, SUBFRAME #2, SUBFRAME #3, SUBFRAME #6, and SUBFRAME #7" on the MBSFN RADIO FRAME have been configured as MBSFN SUBFRAME, respectively.

When this rule is applied, in one example, in a different manner from the legacy TDD CELL-related MBSFN_BITMAP application, this is indicative whether "SUBFRAME #2" (that is, this subframe is designated as UL SUBFRAME on all legacy TDD UL-DL configuration(s)) is configured as MBSFN SUBFRAME.

In this connection, in one example, when ALLDL_CELL configures "SUBFRAME #2" as MBSFN SUBFRAME, the amount of interference (for example, interference caused by CRS/CSI-RS and/or CONTROL/DATA CHANNEL transmission of ALLDL_CELL) to be applied to "UL SUBFRAME #2" of the LEGACY TDD CELL(S) (named "LETDD_CELL") on the adjacent channel may be reduced. Further, in one example, the application of the [Proposed method #1] above may be interpreted as assuming (or considering) ALLDL_CELL as a kind of FDD cell.

[Proposed method #2] In one example, ALLDL_CELL-related MBSFN_BITMAP may indicate whether "SUBFRAME #2, SUBFRAME #3, SUBFRAME #4, SUBFRAME #7, SUBFRAME #8, and SUBFRAME #9" on the MBSFN RADIO FRAME have been configured as MBSFN SUBFRAME, respectively.

In one example, the application of this rule may be interpreted as allowing (or supporting) whether SUFRAME #2 is configured as an MBSFN SUBFRAME, for an ALLDL_CELL that uses "SUFRAME #2" (that is, this subframe is specified as UL SUBFRAME on all legacy TDD UL-DL configuration(S)) as DL SUBFRAME".

In this connection, in one example, the bit to inform (additionally) whether or not "SUFRAME #2" is configured as MBSFN SUBFRAME may be defined to employ (reuse) a bit that was not used in legacy TDD CELL-related MBSFN_BITMAP, or may be newly (or additionally) defined. In the former case, in one example, the entire MBSFN_BITMAP SIZE may remain the same as in a legacy case.

In this connection, in one concrete example, in the case of "FOUR RADIO FRAME (S) MBSFN_BITMAP", the last 4 bits of the corresponding MBSFN_BITMAP (see Table 2) may indicate sequentially whether SUFRAME #2 of FIRST MBSFN RADIO FRAME, SUFRAME #2 of SECOND MBSFN RADIO FRAME, SUFRAME #2 of THIRD MBSFN RADIO FRAME, and SUFRAME #2 of FOURTH MBSFN RADIO FRAME are sequentially configured as MBSFN SUBFRAME.

In case of ONE RADIO FRAME(S) MBSFN_BITMAP, the last 1 bit (see Table 2) of corresponding MBSFN_BITMAP indicates whether or not "SUFRAME #2 of MBSFN RADIO FRAME" is configured as MBSFN SUBFRAME.

[Proposed method #3] In one example, the application of ALLDL_CELL-related MBSFN_BITMAP may be assumed to be the same as that of the legacy TDD cell (that is, a scheme that indicates whether SUBFRAME #3, SUBFRAME #4, SUBFRAME #7, SUBFRAME #8, SUBFRAME #9 (on MBSFN RADIO FRAME) are each configured as MBSFN SUBFRAME).

In one example, the application of this rule may be interpreted as not allowing (or supporting) whether SUFRAME #2 is configured as an MBSFN SUBFRAME, for an ALLDL_CELL that uses "SUFRAME #2" (that is, this subframe is specified as UL SUBFRAME on all legacy TDD UL-DL configuration(S)) as "DL SUBFRAME".

Thereafter, the user device may determine an MBSFN subframe based on the MBSFN configuration information (S1120). In this connection, the MBSFN subframe as determined by the user device may be plural. A concrete example of the MBSFN frame and MBSFN subframe is as described above.

The user device may perform wireless communication based on the determined MBSFN subframe (1130). In this connection, a concrete example in which the user device performs wireless communication based on the MBSFN subframe is as described above.

2. HARQ-ACK signaling method when the TDD frame consists of downlink subframes only and, the TDD frame, in this connection, is used as a secondary cell.

In the carrier aggregation scheme, primary and secondary cells may exist. If a primary cell and several secondary cells are configured for the user device, the user device transmits the uplink control information of the secondary cell as well as the primary cell-related (uplink control) information to the base station via the primary cell (for example, via the PUCCH and/or PUSCH of the primary cell). In this connection, the carrier aggregation technique may include TDD cell and TDD cell aggregation, FDD cell and FDD cell aggregation, and TDD cell and FDD cell aggregation (for example, TDD cell is primary cell, FDD cell is secondary cell, or FDD cell is primary cell and TDD cell is secondary cell).

Under the carrier aggregation technique, generally, when the primary cell is a TDD cell, HARQ-ACK feedback timing may be an issue. For this reason, the HARQ-ACK information of the secondary cell is transmitted via the primary cell. The reason is that if the primary cell is a TDD cell, the primary cell does not always exist as an uplink. Therefore, when the primary cell is a TDD cell, the transmission method of the HARQ-ACK information of the secondary cell needs to be specifically provided. Hereinafter, when the primary cell is a TDD cell and the secondary cell is a TDD cell composed only of downlink subframes, the transmission method of HARQ-ACK information of the secondary cell is mainly explained.

In one example, if ALLDL_CELL is configured with another (LEGACY) TDD CELL(S) (and/or FDD CELL(S)) using a carrier aggregation scheme (CA), the configuration methods of the efficient HARQ-ACK feedback timing are as follows.

In this connection, in one example, a rule may be defined such that some (or all) of the proposed methods below may be applied only a case when ALLDL_CELL is configured using SELF SCHEDULING (SFS), and/or a case when ALLDL_CELL is configured using CROSS CARRIER SCHEDULING (CCS).

Figure 12:
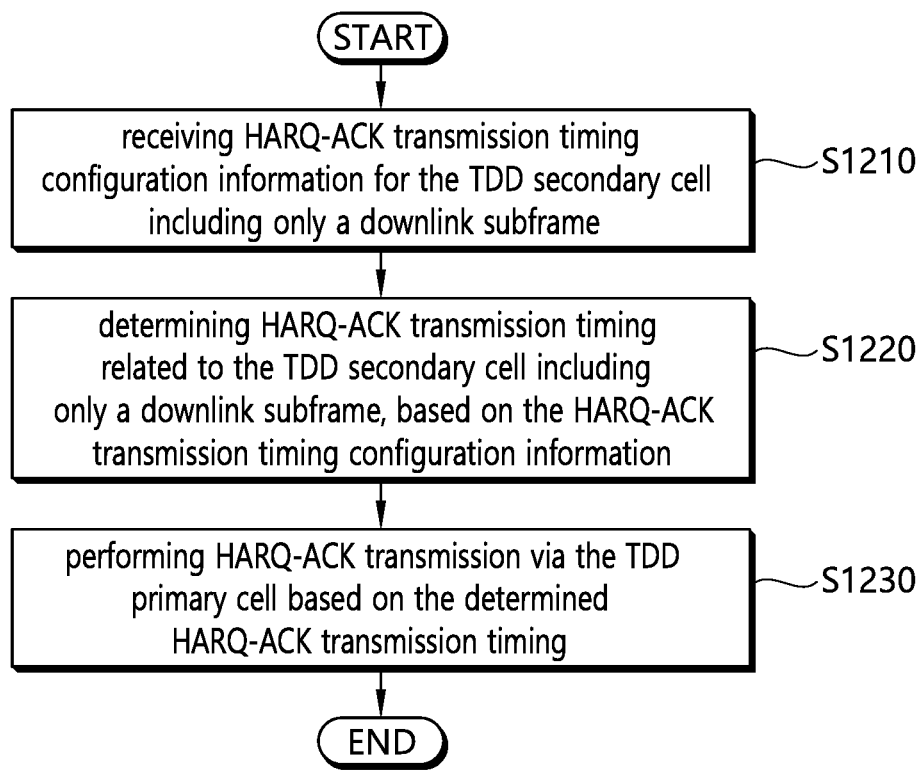
FIG. 12 is a flowchart of a HARQ-ACK feedback method according to one embodiment of the present invention.

FIG. 12 is a flowchart of a HARQ-ACK feedback method according to one embodiment of the present invention.

Referring to FIG. 12, the user device may receive Hybrid Automatic Repeat and Request (HARQ)-ACK transmission timing configuration information (S1210). In this connection, the user device may be a user device for which a TDD (Time Division Duplex) primary cell and a TDD secondary cell is configured.

The HARQ-ACK transmission timing information may refer to HARQ-ACK transmission timing information about a TDD cell including only downlink subframes.

More specifically, [Proposed method #4] A rule may be defined such that, by considering ALLDL_CELL as (some sort of) FDD (SECONDARY) CELL, the DL data reception-related HARQ-ACK timing in the ALLDL_CELL may follow the legacy HARQ-ACK timing (see Table 3) of the FDD (SECONDARY) CELL under the CA context of the TDD/FDD CELL(S). That is, the HARQ-ACK transmission timing information may be the (legacy) HARQ-ACK transmission timing information of the FDD (SECONDARY) CELL.

For ease of understanding, this embodiment will be described with reference to the drawings.

Figure 13:
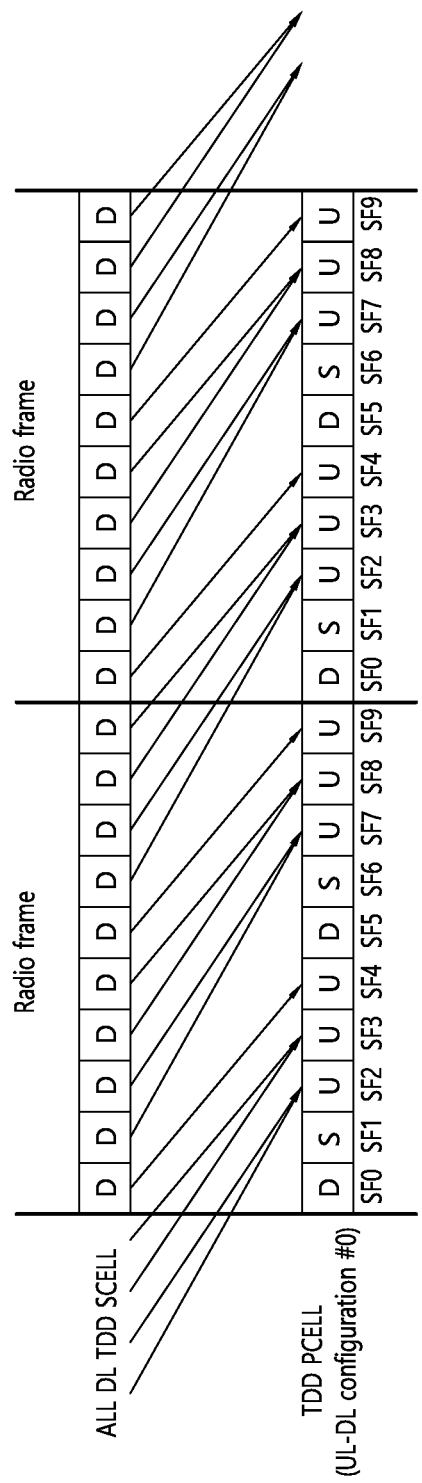
FIG. 13 shows a subframe of a TDD PCELL in which HARQ-ACK information of the ALL DL TDD SCELL is transmitted in the case of UL-DL configuration #0.

FIG. 13 shows a subframe of a TDD PCELL in which HARQ-ACK information of the ALL DL TDD SCELL is transmitted in the case of UL-DL configuration #0.

According to FIG. 13, if the index of the UL-DL configuration, is for example 0, the user device transmits, via (PUCCH of) subframe #2 of the primary cell, ACK/NACK information about downlink data received in 5th and 6th subframes before the subframe #2 of the secondary cell (in this connection, the $5^{th}$ and $6^{th}$ subframes may mean subframes of the secondary cell). Further, the user device transmits, via a PUCCH of subframe #3 of the primary cell, ACK/NACK information about downlink data received in 4th and 5th subframes before the subframe #3 of the secondary cell (in this connection, the $4^{th}$ and $5^{th}$ subframes may mean subframes of the secondary cell). Further, the user device transmits, via a PUCCH of subframe #4 of the primary cell, ACK/NACK information about downlink data received in 4th subframe before the subframe #4 of the secondary cell (in this connection, the $4^{th}$ subframe may mean subframes of the secondary cell). Further, the user device transmits, via (PUCCH of) subframe #7 of the primary cell, ACK/NACK information about downlink data received in 5th and 6th subframes before the subframe #7 of the secondary cell (in this connection, the $5^{th}$ and $6^{th}$ subframes may mean subframes of the secondary cell). Further, the user device transmits, via a PUCCH of subframe #8 of the primary cell, ACK/NACK information about downlink data received in 4th and 5th subframes before the subframe #8 of the secondary cell (in this connection, the $4^{th}$ and $5^{th}$ subframes may mean subframes of the secondary cell). Further, the user device transmits, via a PUCCH of subframe #9 of the primary cell, ACK/NACK information about downlink data received in 4th subframe before the subframe #9 of the secondary cell (in this connection, the $4^{th}$ subframe may mean subframes of the secondary cell).

The above-described example is merely a representative description of the case where the index of the UL-DL configuration is zero. That is, when the index of the UL-DL configuration is 1, 2, 3, 4, 5 and/or 6, the user device may transmit ACK/NACK information about the downlink data received in the subframes of the secondary cell via the primary cell as shown in Table 3.

Returning back to FIG. 12,

[Proposed method #5] In one example, Table 3 shows the (SFS) HARQ-ACK timing of the FDD SCELL under the CA situation of (legacy) TDD PCELL (PRIMARY CELL) and FDD SCELL (SECONDARY CELL).

In this connection, in one example, as shown in Table 3, the HARQ-ACK timing of the FDD SCELL depends on the (SIB1) UL-DL configuration information of the TDD PCELL. (When the [Proposed method #4] is applied), a rule may be defined such that DL data reception-related HARQ-ACK TIMING in ALLDL_CELL (that is, secondary cell) is not (actual) SIB1 UL-DL CONFIGURATION of TDD PCELL, but, the DL data reception-related HARQ-ACK timing in ALLDL_CELL (that is, the secondary cell) is derived (or determined) based on TDD PCELL UL-DL configuration information as signaled (or pre-defined) for the corresponding purpose.

In this connection, the TDD PCELL UL-DL CONFIGURATION information as signaled (or pre-defined) for the corresponding purpose may also be TDD PCELL UL-DL configuration information as signaled via the upper layer (for example, RRC signaled). The reason for performing additional signaling for the corresponding purpose is to increase the flexibility of TDD PCELL UL-DL CONFIGURATION.

In this connection, in one example, the TDD PCELL UL-DL configuration information as signaled for corresponding purpose may differ from the (actual) SIB1 UL-DL configuration of the TDD PCELL.

In another example, a rule may be defined such that when ALLDL_CELL (SCELL) is subjected to CCS from TDD PCELL, the DL data reception-related HARQ-ACK TIMING on the ALLDL_CELL DL SUBFRAME corresponding to the UL SF point of the TDD PCELL follows the FDD SCELL SFS-related HARQ-ACK TIMING under the CA situation of the legacy TDD PCELL and the FDD SCELL (or follows the legacy HARQ-ACK TIMING based on the parameters in TABLE 10.1.3A-1 in Table 3).

In this connection, in one example, ALLDL_CELL may be interpreted as being regarded as (some sort of) FDD SCELL.

Further, in one example, DL data transmission/reception on the ALLDL_CELL SUBFRAME corresponding to the UL SUBFRAME of the TDD PCELL may be configured to be scheduled via the application of the following schemes: MSFS (MULTI-SUBFRAME SCHEDULING) scheme (that is, a scheme for scheduling a PDSCH on which one downlink control information channel is received at the same point in time, and a pre-defined (or signaled) number of PDSCHs that are received at another point in time), and/or a SFS scheme (and/or a scheme for generating one virtual DL SUBFRAME via merging with the pre-defined number of ALLDL_CELL DL SUBFRAME(S) corresponding to the previous PCELL DL SUBFRAME(S)).

In the case where the above-described methods are applied, there is an advantage that the HARQ-ACK information transmission method as defined in the legacy manner need not be substantially changed.

[Proposed method #6] DL data reception-related HARQ-ACK timing in ALLDL_CELL may be defined to follow HARQ-ACK timing of TDD PCELL.

In another example, a rule may be defined such that the DL data reception-related HARQ-ACK timing in ALLDL_CELL follows an ALL DL_CELL DL HARQ REFERENCE (TDD) CONFIGURATION information as additionally signaled (or pre-defined) for the corresponding purpose.

Then, the user device determines HARQ-ACK transmission timing based on the HARQ-ACK transmission timing configuration information (S1220). In this connection, the HARQ-ACK transmission timing determined by the user device may be the transmission timing of the HARQ-ACK information about the downlink data received in the TDD secondary cell including only the downlink subframe. In this connection, details of the HARQ-ACK transmission timing are as described above.

Then, the user device performs HARQ-ACK transmission of the secondary cell via the primary cell based on the determined HARQ-ACK transmission timing (S1230). In this connection, the primary cell may be a TDD cell as described above. A specific example of performing HARQ transmission is as described above.

It is obvious that examples of the proposed method described above may also be included as one of the implementation methods of the present invention, and thus may be regarded as a kind of proposed methods.

Further, the proposed schemes described above may be implemented independently, but may also be implemented as a combination (or merging) of some of the proposed schemes. Thus, 1. the method to signal MBSFN subframe to the user device when the TDD frame consists of only downlink subframes; and 2. the HARQ-ACK signaling method when the TDD frame is composed of downlink subframes only and, in this connection, the TDD frame is used as a secondary cell may be performed independently or in combination thereof.

In the proposed schemes described above, the term "DL SF" may be extended to DL SF and/or DwPTS (and/or SPECECIAL SF). Further, the term "UL SF" may be extended to UL SF and/or UpPTS (and/or SPECECIAL SF).

Figure 14:
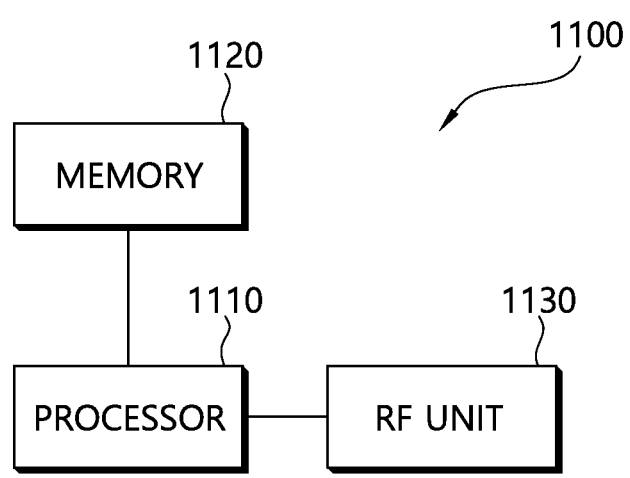
FIG. 14 is a block diagram illustrating the user device in which an embodiment of the present invention is implemented.

FIG. 14 is a block diagram illustrating the user device in which an embodiment of the present invention is implemented.

Referring to FIG. 14, the user device 1100 includes a processor 1110, a memory 1120, and a radio frequency unit 1130. Processor 1110 implements the proposed functionality, process and/or method. For example, the processor 1110 may receive MULTIMEDIA BROADCAST SINGLE FREQUENCY NETWORK (MBSFN) configuration information related to a TDD frame composed of only downlink subframes. The processor 1110 may determine an MBSFN subframe based on the MBSFN configuration information. Thereafter, the processor 1110 may perform wireless communication based on the MBSFN subframe.

The RF unit 1130 is connected to the processor 1110 to transmit and receive radio signals.

The processor may comprise an application-specific integrated circuit (ASIC), other chipset, logic circuitry and/or a data processing device. The memory may include read-only memory (ROM), random access memory (RAM), flash memory, memory card, storage media and/or other storage devices. The RF unit may include a baseband circuit for processing the radio signal. When the embodiment is implemented in software, the above-described techniques may be implemented with modules (processes, functions, etc.) that perform the functions described above. The module may be stored in memory and executed by the processor. The memory may be internal or external to the processor, and may be coupled to the processor by any of a variety of well known means.

What is claimed is:

1. A method for performing a Hybrid Automatic Repeat and Request Acknowledgement (HARQ-ACK) transmission in a wireless communication system, the method performed by a user equipment (UE), for which a primary cell and a secondary cell are configured, and comprising:
receiving, from a base station, an actual uplink-downlink configuration for the primary cell via a system information block (SIB);
receiving, from the base station, a specific uplink-downlink configuration used for the secondary cell via a radio resource control (RRC) signal; and
performing, to the base station, the HARQ-ACK transmission for the secondary cell via the primary cell,
wherein the primary cell is a cell based on time division duplex (TDD), and the secondary cell is a cell based on TDD,
wherein the UE is aggregated with the primary cell and the secondary cell,
wherein the secondary cell only includes a plurality of downlink subframes, and
wherein, based on the secondary cell only including the plurality of downlink subframes, the HARQ-ACK transmission for the secondary cell is performed based on applying a HARQ-ACK timing used for frequency division duplex (FDD) under a TDD and FDD carrier aggregation condition, wherein, in case of the TDD and FDD carrier aggregation condition when a specific primary cell is a cell based on TDD and a specific secondary cell is a cell based on FDD, the UE receives a data via the specific secondary cell based on FDD and performs a specific HARQ-ACK transmission for the data on the specific primary cell based on TDD, wherein, based on applying the HARQ-ACK timing used for FDD, the UE performs the HARQ-ACK transmission for the secondary cell not based on the actual uplink-downlink configuration but on the specific uplink-downlink configuration, and wherein the specific uplink-downlink configuration is different from the actual uplink-downlink configuration.

2. A user equipment (UE), for which a primary cell and a secondary cell are configured, comprising:
a transceiver configured for transmitting and receiving a radio signal,
a processor operatively coupled to the transceiver, wherein the processor is configured to:
control the transceiver to receive, from a base station, an actual uplink-downlink configuration for the primary cell via a system information block (SIB);
control the transceiver to receive, from the base station, a specific uplink-downlink configuration used for the secondary cell via a radio resource control (RRC) signal; and
perform, to the base station, a Hybrid Automatic Repeat and Request Acknowledgement (HARQ-ACK) transmission for the secondary cell via the primary cell, wherein the primary cell is a cell based on time division duplex (TDD), and the secondary cell is a cell based on TDD, wherein the UE is aggregated with the primary cell and the secondary cell, wherein the secondary cell only includes a plurality of downlink subframes, and wherein, based on the secondary cell only including the plurality of downlink subframes, the HARQ-ACK transmission for the secondary cell is performed based on applying a HARQ-ACK timing used for frequency division duplex (FDD) under a TDD and FDD carrier aggregation condition, wherein, in case of the TDD and FDD carrier aggregation condition when a specific primary cell is a cell based on TDD and a specific secondary cell is a cell based on FDD, the UE receives a data via the specific secondary cell based on FDD and performs a specific HARQ-ACK transmission for the data on the specific primary cell based on TDD, wherein, based on applying the HARQ-ACK timing used for FDD, the UE performs the HARQ-ACK transmission for the secondary cell not based on not the actual uplink-downlink configuration but on the specific uplink-downlink configuration, and wherein the specific uplink-downlink configuration is different from the actual uplink-downlink configuration.

* * * * *